United States Patent [19]
McKeigue

[11] Patent Number: 5,419,136
[45] Date of Patent: May 30, 1995

[54] DISTILLATION COLUMN UTILIZING STRUCTURED PACKING HAVING VARYING CRIMP ANGLE

[75] Inventor: Kevin McKeigue, New York, N.Y.

[73] Assignee: The BOC Group, Inc., New Providence, N.J.

[21] Appl. No.: 122,950

[22] Filed: Sep. 17, 1993

[51] Int. Cl.⁶ .............................................. F25J 3/02
[52] U.S. Cl. ............................................ 62/24; 62/22; 62/36; 261/94
[58] Field of Search .................. 62/22, 36, 24; 261/94

[56] References Cited

U.S. PATENT DOCUMENTS 5,100,448  3/1992  Lockett et al. ........................ 62/24
5,267,444  12/1993  Lehman et al. ....................... 62/36

Primary Examiner—Ronald C. Capossela
Attorney, Agent, or Firm—David M. Rosenblum; Larry R. Cassett

[57] ABSTRACT

A distillation column for separating atmospheric gases in which structured packing having varying crimp angles is utilized within at least two sections or subsections of a single section of a distillation column. In the case of the use of structured packing in multiple sections, the crimp angle of the structured packing used in the first section is greater than that of the second section and is selected such that both sections operate at the same maximum design percentage of flooding limit. The increased crimp angle of the first section decreases the HETP of the packing and thereby allows a column design of reduced height. Structured packing having different crimp angles can be used in a single section of a column when such section is subjected to possible variation of vapor rate. Here the crimp angles are again manipulated so that the subsections operate at the same maximum design percentage of flooding limit. The foregoing adaptation improves turndown performance.

10 Claims, 2 Drawing Sheets

DISTILLATION COLUMN UTILIZING STRUCTURED PACKING HAVING VARYING CRIMP ANGLE

BACKGROUND OF THE INVENTION

The present invention relates to a distillation column in which structured packing is utilized as a contacting element to bring liquid and gaseous phases of a mixture of atmospheric gases to be separated into intimate contact. More particularly, the present invention relates to such a distillation column in which the crimp angle of the structured packing is varied to optimize column height and performance.

In fractional distillation of a mixture of atmospheric gases, components of the mixture are separated in a distillation column. In the column, a vapor phase of the mixture ascends with an ever increasing concentration of the more volatile components (for instance, nitrogen) while a liquid phase of the mixture descends with an ever increasing concentration of the less volatile components (for instance, oxygen). Various packings are used within the distillation column to bring the liquid and gaseous phases of the mixture into intimate contact in order to accomplish mass transfer between the phases.

Structured packing has been found to be an attractive contacting element in many distillation applications for such reasons as simplicity of construction, uniform performance and low pressure drop. It has long been known that the only bar to the use of structured packing in most common distillations are cost constraints. Therefore, it is important that the structured packing be used in the most efficient manner from the standpoint of using the least amount of structured packing required for the distillation column.

As will be discussed the present invention provides a column design for separating atmospheric gases in which the height of structured packing utilized within the column is at a minimum for the particular distillation involved.

SUMMARY OF THE INVENTION

The present invention provides a distillation column for separating atmospheric gases. Here it is appropriate to point out that the term "atmospheric gas" as used herein and in the claims means air or a mixture of atmospheric gases which can predominantly contain argon and oxygen in a crude argon column or even rare gases when rare gases are to be separated. The distillation column of the present invention comprises at least first and second sections of equal diameter. Structured packing of constant density is located in the first and second sections for bringing liquid and gaseous phases of a mixture to be separated into intimate contact. The structured packing utilized in the first and second sections comprises first and second structured packings having respective first and second crimp angles. The first crimp angle of the first structured packing has a greater magnitude than the second crimp angle. The greater magnitude of the first crimp angle is preselected such that the first and second structured packings and therefore the first and second sections operate at a substantially equal maximum design percentage of their flooding limits.

As used herein and in the claims, a "section" of a distillation column is a region located directly between feeds and draws of a column or put another way, a region of a distillation column located between levels of the column where vapor and/or liquid is introduced and/or removed from the column. "Structured packing" is any contact element employing either a plurality sheets arranged, in a vertical orientation, face to face or one or more sheets arranged in a roll, having crimps or crimping to provide channels within the packing for the vapor and liquid phases to ascend and descend, respectively. Furthermore, the structured packing itself can be fabricated from sheet material such as aluminum, copper, stainless steel, plastic, woven mesh or gauze. The term "crimp angle" as used herein and in the claims means the angle of the crimps as measured from the vertical when the packing is installed within the column. Furthermore, the term "density" when applied to structured packing, herein and in the claims, refers to the surface area of the packing per unit volume of packing. The term "density" when applied to the vapor and liquid phases has its usual meaning of mass per unit volume.

It should be further pointed out that "flooding limit" of a packing as used herein or in the claims can be an arbitrary or a calculated point of operation. The flooding limit can be arbitrarily set as a point of operation at which the packing or column ceases to operate in an acceptable manner, either because of a rapid rise in pressure drop or a rapid rise in HETP. The flooding limit can be calculated on the basis of the vapor flooding parameter ($C_V$) and the liquid flooding parameter ($C_L$). The value of the vapor flooding parameter obtained on a Wallis diagram of the square root of the vapor flooding parameter versus the square root of the liquid flooding parameter is the maximum $C_V$, or equivalently, vapor rate, that can be experienced by the column at the flooding limit. The percent of the flooding limit can therefore be said to be the $C_V$ in a section of packing over the $C_V$ as determined by the Wallis diagram or a percentage of the arbitrarily set point of maximum operation.

As is well known in the art $$C_L = U_L \times (\rho_L/(\rho_L - \rho_V))^{0.5}$$

$$C_V = U_V \times (\rho_V/(\rho_L - \rho_V))^{0.5}$$

where $U_L$ is the superficial liquid velocity, $U_V$ is the superficial vapor velocity, $\rho_L$ is the density of the liquid phase, and $\rho_V$ is the density of the vapor phase.

Distillation columns are designed so that the vapor rate does not reach flooding in any section of structured packing, but instead is about 75 to 85 percent of the flooding limit as a maximum percentage of flooding limit. The actual percentage is often fixed by the ability to control the column.

The separation performance of structured packing is often given in terms of height equivalent to a theoretical plate or HETP. The smaller the HETP of a particular packing for a specific separation, the more efficient the packing because the height of packing being utilized decreases with the HETP. It has been found that the efficiency of a packing increases with the crimp angle. While not wishing to be held to any specific theory of operation, it is believed by the inventor herein that the reason for this is that the path and therefore the residence time of the liquid phase within the packing increases with the crimp angle to in turn lower the HETP. There is however a tradeoff between increased crimp angles and lower HETP. The tradeoff is as the crimp angle is increased, the flooding limit of a packing decreases. As will be discussed, this tradeoff is advantageously used by the inventor herein to optimize column height by optimizing HETP of the packing used in the various sections or subsections of the column.

Turning back to the invention, as outlined above, if structured packing having the same crimp angle were used in both the first and second sections (a mode of use of structured packing consistent with the prior art), then at the maximum design vapor rate through the sections, the first section would operate at a lower percentage of its flooding limit than the second section at the maximum design flooding limit thereof. As mentioned previously, though, crimp angle of structured packing bears a relationship to its separation performance or HETP and also to its pressure drop and therefore, its flooding limit. The greater the crimp angle, for a given hydraulic loading, the sooner the packing will flood in terms of flooding occurring at a lower $C_v$ for a specific $C_L$. Therefore, in raising the crimp angle of the structured packing used in a more lightly loaded section of the column, both sections can be made to operate at the same percentage of their flooding limit. Moreover, since the crimp angle is raised for the first section, the HETP of the first section will decrease over that HETP that would have been obtained had the same crimp angle been utilized for the packing in all sections of the column. Hence, in a column in accordance with the present invention, less structured packing will be utilized. It has been found that an added benefit to varying the crimp angle between sections so that all sections will be constrained to operate at the same percentage of their flooding limit is that the turndown performance of the column also improves.

This concept of improved turndown performance by manipulating the crimp angle of the structured packing to induce more uniform performance within the column can also be advantageously utilized in a one or more sections of a column that employs structured packing in which different parts of the section or subsections of the column are potentially being subjected to different vapor or liquid rates. The change in vapor or liquid rate can be attributed to such factors as changes in density or increases and decreases in the amount of vapor or liquid due to mass transfer. In accordance with this aspect of the present invention, a distillation column is provided that comprises at least one section having at least first and second subsections. Structured packing of constant density is located in the first and second subsections for bringing liquid and gaseous phases of a mixture to be separated into intimate contact with one another. The structured packing utilized in the first and second subsections comprises two different types of structured packing distinguished from one another by having different crimp angles such that each of the first and second subsections operates at a substantially equal maximum design percentage of their flooding limit.

BRIEF DESCRIPTION OF THE DRAWINGS

While the specification concludes with claims distinctly pointing out the subject matter that applicant regards as his invention, it is believed that the invention will be better understood when taken in conjunction with the accompanying drawings in which:

DETAILED DESCRIPTION

Figure 1:
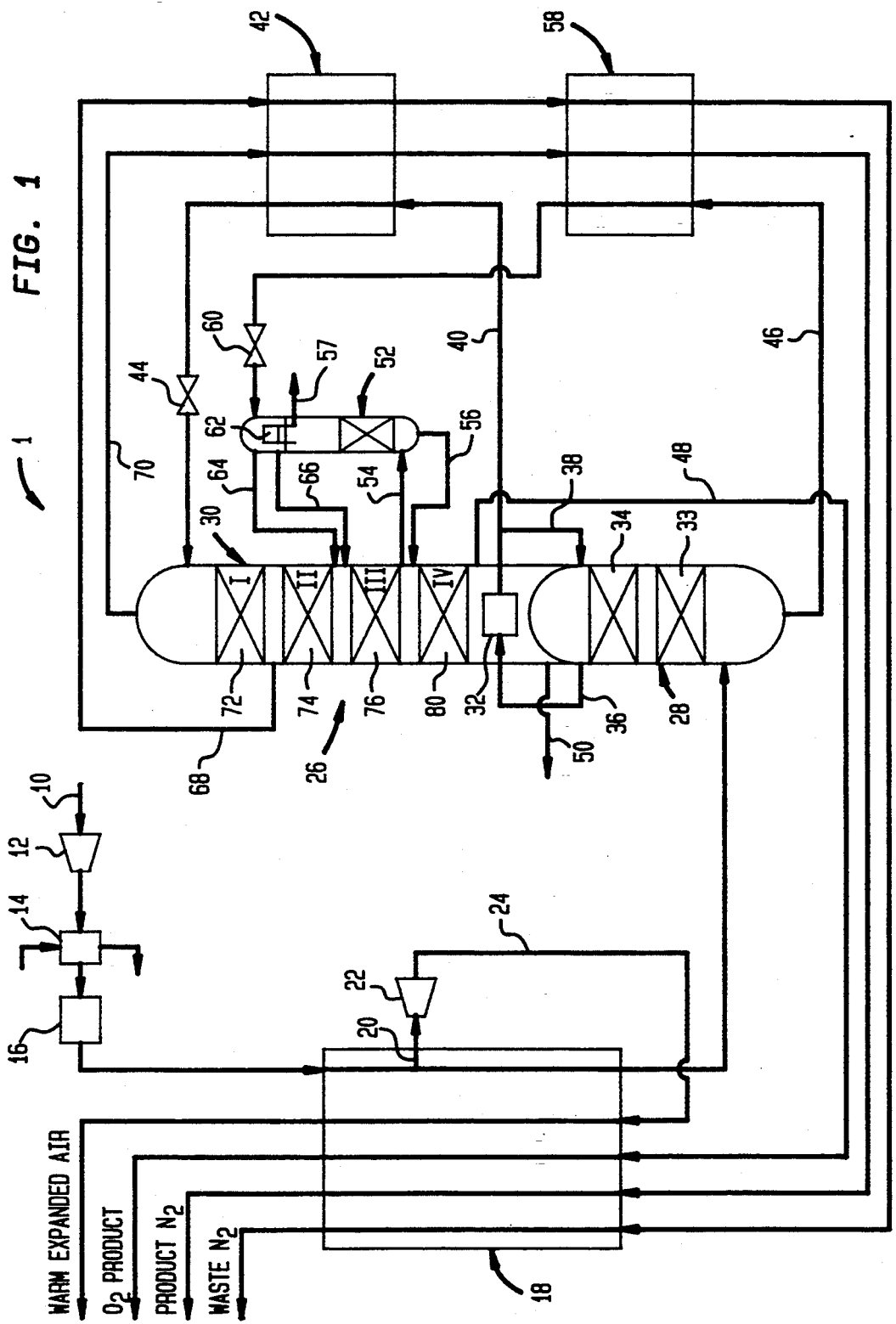
FIG. 1 is a schematic of an air separation plant utilizing a distillation column in accordance with the present invention.

With reference to the FIG. 1, an air separation plant 1 is illustrated. In air separation plant 1, an air stream 10 after having been suitably filtered is compressed by a main compressor 12. The heat of compression is then removed by an aftercooler 14 and the air is purified by removal of hydrocarbons, carbon dioxide and water within a purifier 16. Purifier 16 is preferably multiple beds of molecular sieve material operating out of phase for regeneration purposes. Air stream 10 is then fully cooled within a main heat exchanger 18 to a temperature suitable for its rectification. After air stream 10 has been partially cooled, a partial stream 20 is diverted from air stream 10 into a turboexpander 22. An exhaust stream 24 of turboexpander 22 is introduced into main heat exchanger 18 in a direction countercurrent to air stream 10 to add refrigeration to air separation plant 1. Air stream 10 is then introduced into a double rectification column 26 comprising a high pressure column 28 operatively associated in a heat transfer relationship with a low pressure column 30 by a condenser-reboiler 32.

High pressure column 28 contains beds of structured packing designated by reference numerals 33 and 34. In high pressure column 28, as a vapor phase ascends through structured packing beds 33 and 34, the concentration of nitrogen, the more volatile component of the air, increases within the vapor phase. At the same time, a liquid phase descends within structured packing beds 33 and 34. The liquid phase has an ever-increasing concentration of oxygen, the less volatile component of air, as it descends within the column. The end result is that a nitrogen vapor tower overhead collects at the top of high pressure column 28 and an oxygen rich liquid column bottom collects in the bottom of high pressure column 28. A top vapor stream 36 composed of the nitrogen vapor tower overhead of high pressure column 28 is introduced into condenser-reboiler 32 where it vaporizes liquid oxygen collecting in the bottom of low pressure column 30 against its own condensation. A poor liquid reflux stream 38, composed of such condensate is fed into the top of high pressure column 28 as reflux. Another poor liquid stream 40, after having been subcooled in first section 42 of a subcooler and reduced in pressure by a Joule-Thompson valve 44 to the pressure of low pressure column 30, is introduced into the top of low pressure column 30 as reflux.

Low pressure column 30 further refines the air by separating oxygen from nitrogen in a rich liquid stream 46 composed of the oxygen-rich liquid column bottoms of high pressure column 28. As described previously, liquid oxygen collects in the bottom of low pressure column 30 and oxygen is extracted as a gaseous oxygen stream 48 and a liquid oxygen stream 50. Gaseous oxygen stream 48 is warmed within main heat exchanger 18 to produce a gaseous oxygen product and liquid oxygen stream 50 is removed as a liquid product.

As will be discussed, crude argon is also produced in air separation plant 1 by a crude argon column 52. An argon column draw and an argon column feed to low pressure column 30 are designated by argon column stream 54 and argon column return stream 56. Crude argon column 52 produces a crude argon product stream 57 from its tower overhead. Rich liquid stream 46 after having been subcooled in a second section 58 of the subcooler is expanded by being forced through a Joule-Thompson valve 60. The rich liquid having thus been reduced in temperature is then used in condensing argon tower overhead produced in a head condenser 62. The result of such condensation is to produce rich liquid vapor and rich liquid feed streams 64 and 66 to low pressure column 30.

The descending liquid phase and ascending vapor phase produce a nitrogen tower overhead within low pressure column 30. A slightly less pure form of the nitrogen is withdrawn as a waste nitrogen stream 68. A nitrogen product stream 70 is withdrawn from the top of low pressure column 30. Waste nitrogen and nitrogen product streams 68 and 70 are passed through the subcooler, first and second sections 42 and 58 thereof in a counter-current direction to poor liquid stream 40 and rich liquid stream 46. Thereafter, waste nitrogen stream 68 and pure nitrogen product streams 70 pass through main heat exchanger 18 from which they are withdrawn as waste nitrogen and nitrogen product streams.

The following table is a calculated example of the operation of air separation plant 1. Any stream labeled as liquid has a liquid fraction of about 100 percent and any stream not so labeled as vapor has a vapor fraction of about 100 percent.

| Stream Name | Temp K. | Pressure (bar) | Flow rate (kg/h) | Composition (mol %) | | |
|---|---|---|---|---|---|---|
| | | | | $N_2$ | $O_2$ | Ar |
| Air stream 10 after purification | 293.00 | 5.80 | 41615.30 | 78.11 | 20.96 | 0.93 |
| Partial air stream 20 | 150.00 | 5.73 | 5745.40 | 78.11 | 20.96 | 0.93 |
| Expanded air stream 24 | 103.95 | 1.27 | 5745.40 | 78.11 | 20.96 | 0.93 |
| Expanded air stream 24 after being fully warmed to ambient in main heat exchanger 18 | 291.00 | 1.13 | 5745.40 | 78.11 | 20.96 | 0.93 |
| Air stream 10 after cooling within main heat exchanger 18 | 100.06 | 5.66 | 35869.90 | 78.11 | 20.96 | 0.93 |
| Top vapor stream 36 | 95.24 | 5.50 | 37408.20 | 100.00 | 0.00 | 0.00 |
| Poor liquid stream 40 | 95.24 | 5.50 | 15361.00 | 100.00 | 0.00 | 0.00 |
| Poor liquid reflux stream 38 | 95.24 | 5.50 | 22047.20 | 100.00 | 0.00 | 0.00 |
| Poor liquid stream 40 after subcooling within first subcooler 42 | 82.85 | 5.50 | 15360.80 | 100.00 | 0.00 | 0.00 |
| Rich liquid stream 46 | 99.79 | 5.66 | 20509.10 | 60.73 | 37.60 | 1.66 |
| Rich liquid stream 46 after subcooling in second subcooler 58 | 96.66 | 5.66 | 20509.10 | 60.73 | 37.60 | 1.66 |
| Rich liquid stream 46 after J-T Valve 60 | 85.51 | 1.68 | 20509.10 | 60.73 | 37.60 | 1.66 |
| Rich liquid vapor feed stream 64 | 87.18 | 1.61 | 13893.00 | 70.26 | 28.24 | 1.50 |
| Rich liquid feed stream 66 | 87.18 | 1.61 | 6616.40 | 39.87 | 58.10 | 2.04 |
| Argon column stream 54 | 92.42 | 1.35 | 11605.00 | 0.00 | 85.85 | 14.15 |
| Argon column return stream 56 (liquid) | 92.33 | 1.35 | 11176.50 | 0.00 | 88.52 | 11.48 |
| Crude liquid argon product stream 57 | 89.28 | 1.25 | 428.30 | 0.07 | 1.54 | 98.40 |
| Nitrogen product stream 70 | 79.61 | 1.32 | 21914.00 | 100.00 | 0.00 | 0.00 |
| Nitrogen product stream 70 after warming in first subcooler 42 | 93.23 | 1.30 | 21914.00 | 100.00 | 0.00 | 0.00 |
| Nitrogen product stream 70 after further warming in second subcooler 58 | 97.80 | 1.27 | 21914.00 | 100.00 | 0.00 | 0.00 |
| Nitrogen product stream 70 after fully warming to ambient in main heat exchanger 18 | 291.00 | 1.13 | 21914.00 | 100.00 | 0.00 | 0.00 |
| Gaseous oxygen stream 48 | 93.11 | 1.37 | 8238.60 | 0.00 | 99.84 | 0.16 |
| Gaseous oxygen stream 48 after having been warmed in main heat exchanger 18 | 290.99 | 1.23 | 8238.60 | 0.00 | 99.84 | 0.16 |
| Waste nitrogen stream 68 | 79.69 | 1.32 | 5210.20 | 99.72 | 0.27 | 0.00 |
| Waste nitrogen stream 68 after warming in first subcooler 42 | 93.24 | 1.25 | 5210.20 | 99.72 | 0.27 | 0.00 |
| Waste nitrogen stream 68 after further warming in second subcooler 58 | 96.79 | 1.18 | 5210.20 | 99.72 | 0.27 | 0.00 |
| Waste nitrogen stream 68 after fully warming to ambient in main heat exchanger 18 | 291.00 | 1.11 | 5210.20 | 99.72 | 0.27 | 0.00 |

-continued

| Stream Name | Temp K. | Pressure (bar) | Flow rate (kg/h) | Composition (mol %) | | |
|---|---|---|---|---|---|---|
| | | | | $N_2$ | $O_2$ | Ar |
| Liquid oxygen stream 50 | 93.11 | 1.37 | 78.37 | 0.00 | 99.90 | 0.10 |

Low pressure column 30 has four sections which are labeled by I, II, III and IV. Section I is located between a topmost section of low pressure column 30 from which product nitrogen stream 70 is discharged and an upper level of low pressure column 30 at which waste nitrogen stream 70 is discharged. Section II is located between the upper level of low pressure column 30 and an intermediate level of low pressure column 30 at which rich liquid vapor and rich liquid streams 64 and 66 are introduced. Section III is located between the intermediate level of low pressure column 30 and a lower level of low pressure column 30 at which argon column feed and return streams 54 and 56 are discharged from and introduced into low pressure column 30. Lastly, Section IV is located below the lower level of low pressure column 30. Beds of structured packing designated by reference numerals 72, 74, 76 and 80 are provided as the contacting elements within the four sections. As would be known by those skilled in the art, the beds would be supported on specially designed supports with each bed section rotated 90° from one another so that liquid is not distributed in only one direction of the column. Between beds of structured packing, liquid distributors would also be provided to redistribute the liquid uniformly.

The following table concerns the operation of the column if it were conventionally designed to utilize 500X FLEXIPAC Koch packing having a 30° crimp angle in all four sections, I, II, III, and IV.

| Section | Crimp Angle | HETP (cm) | Packed Height (m) | Hydraulic Load (% of flood) | |
|---|---|---|---|---|---|
| | | | | min | max |
| I | 30.0 | 30.5 | 3.1 | 64.5 | 66.3 |
| II | 30.0 | 30.5 | 6.7 | 65.1 | 80.0 |
| III | 30.0 | 30.5 | 5.2 | 29.0 | 31.7 |
| IV | 30.0 | 30.5 | 7.9 | 62.7 | 63.8 |
| overall | | | 22.9 | 29.0 | 80.0 |

As can be seen section II is the most highly loaded followed by sections I, IV and III.

The following table is low pressure column 30 designed in accordance with the present invention. Note here that sections I, III and IV have all been brought up to a maximum design 80 percent of their flood limit. Note also that the turndown performance has increased and the packing height has decreased. For purposes of this and succeeding charts, the packing used in section I can be said to be a first structured packing, section II a second structured packing, section III a third structured packing, and section IV a fourth structured packing.

| Section | Crimp Angle | HETP (cm) | Packed Height (m) | Hydraulic Load (% of flood) | |
|---|---|---|---|---|---|
| | | | | min | max |
| I | 41.9 | 26.3 | 2.6 | 77.7 | 80.0 |
| II | 30.0 | 30.5 | 6.7 | 65.1 | 80.0 |
| III | 64.8 | 15.0 | 2.6 | 71.8 | 80.0 |
| IV | 43.2 | 25.7 | 6.7 | 78.5 | 80.0 |
| overall | | | 18.6 | 65.1 | 80.0 |

Figure 2:
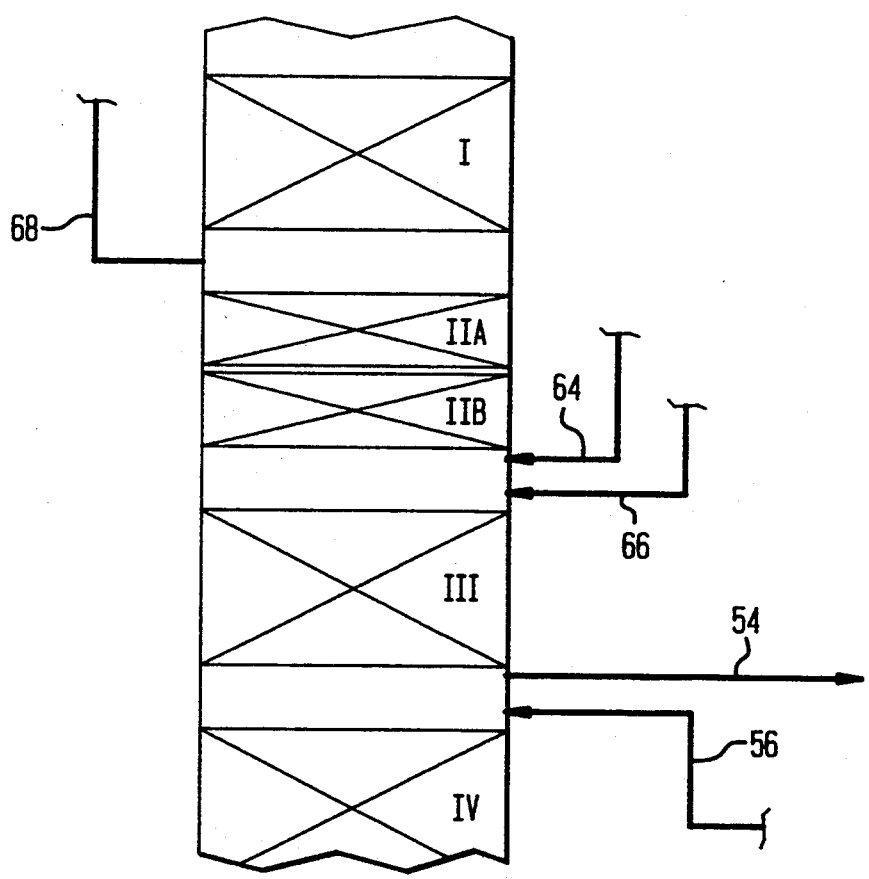
FIG. 2. is a fragmentary enlarged view of FIG. 1 showing an alternate embodiment of a packing arrangement in accordance with the present invention. The same reference numerals that are used in FIG. 1 are used in FIG. 2 for streams and elements having the same function and/or purpose.

Section II at its lower end of performance is below sections I, III and IV. In order to improve its operation, section II can be divided into subsections IIa and IIb. With reference to FIG. 2, subsection IIa is located above subsection IIb and is subjected to a higher liquid rate or liquid flooding parameter due to a change in liquid density and a higher vapor rate or vapor flooding parameter due to a change in vapor density. A fifth structured packing is used in subsection IIb having a greater crimp angle than the second structured packing used in section IIa, that is the thirty degree crimp angle structured packing. The following is a table showing this adaptation of the present invention. As can be seen from this table, turndown performance of section II has increased.

| Section | Crimp Angle | HETP (cm) | Packed Height (m) | Hydraulic Load (% of flood) | |
|---|---|---|---|---|---|
| | | | | min | max |
| I | 41.9 | 26.3 | 2.6 | 77.7 | 80.0 |
| IIa | 30.0 | 30.5 | 3.4 | 70.8 | 80.0 |
| IIb | 38.4 | 27.7 | 3.0 | 73.3 | 80.0 |
| III | 64.8 | 15.0 | 2.6 | 71.8 | 80.0 |
| IV | 43.2 | 25.7 | 6.7 | 78.5 | 80.0 |
| overall | | | 18.3 | 70.8 | 80.0 |

Although the present invention has been illustrated with reference to a low pressure column having four sections, the invention would have applicability, as discussed above, to any other column of an air separation plant having one section in which at least two different types of structured packing were utilized within such section to equalize the percent flood limit within the section.

While the invention has been described with reference to a preferred embodiment, it will be understood by those skilled in the art that numerous changes and additions may be made without departing from the spirit and scope of the present invention.

I claim:

1. A distillation column for separating atmospheric gases comprising:

at least first and second sections of equal diameter; and structured packing of constant density located in the first and second sections for bringing liquid and gaseous phases of a mixture to be separated into intimate contact;

the structured packing utilized in the first and second sections comprising first and second structured packings having respective first and second crimp angles;

the first crimp angle of the first structured packing having a greater magnitude than the second crimp angle and said greater magnitude of the first crimp angle preselected such that the first and second structured packings and therefore the first and second sections, operate at a substantially equal maximum design percentage of their flooding limits.

2. The distillation column of claim 1, wherein:

the second section has at least first and second subsections; the structured packing utilized in the first subsection comprising the second structured packing; and the structured packing utilized in the second subsection comprising another structured packing having a further crimp angle selected such that each of the first and second subsections operates at a substantially equal maximum design percentage of their flooding limit.

3. The distillation column of claim 1, wherein the first section is located below the second section.

4. The distillation column of claim 1, wherein:

the distillation column comprises a low pressure column of an air separation plant designed to separate argon from the air;

the first section is located between a topmost section of the low pressure column from which a product nitrogen stream is discharged from the low pressure columns and an upper level of the low pressure column at which a waste nitrogen stream, having a low purity than the product stream, is discharged;

the second section is located between the upper level of the column and an intermediate level of the low pressure column at which rich liquid and vapor streams are introduced into the low pressure column for further refinement;

the distillation column also has third and fourth sections;

the third section located between the intermediate level of the low pressure column and a lower level of the low pressure column at which an argon column stream containing argon and oxygen is discharged to an argon column for separation of the argon and oxygen and a liquid oxygen stream from the argon column is introduced into the low pressure column;

the forth section located below the lower level of the low pressure column; and the structured packing located within the third and fourth sections comprises a third and fourth structured packing having respective third and fourth crimp angles preselected so that the third and fourth sections operate at substantially equal maximum design percentages of their flooding limits.

5. The distillation column of claim 4, wherein:

the second section has at least two first and second subsections;

the structured packing utilized in the first subsection comprising the second structured packing; and the structured packing utilized in the second subsection comprising a fifth structured packing having a fifth crimp angle selected such that each of the first and second subsections operate at a substantially equal maximum design percentage of their flooding limit.

6. The distillation column of claim 5, wherein the second subsection is located below the first subsection, the distillation column operates so that the maximum liquid and vapor rates are greater in the first subsection than the second subsection, and the fifth crimp angle is greater than the second crimp angle.

7. The distillation column of claims 4 or 5 or 6, wherein said second crimp angle is about 30 degrees and said structured packing has a density throughout the column of no less than 500 $m^2/m^3$.

8. The distillation column of claim 1, wherein said structured packing has a density throughout the column of no less than 500 $m^2/m^3$.

9. The distillation column of claim 1, wherein said second crimp angle is about 30 degrees.

10. A distillation column for separating atmospheric gases comprising:

at least one section having at least first and second subsections; and structured packing of constant density located in the first and second subsections for bringing liquid and gaseous phases of a mixture to be separated into intimate contact;

the structured packing utilized in the first and second subsections comprising two different types of structured packing distinguished from one another by having different crimp angles preselected such that the first and second subsections operate at a substantially equal maximum design percentage of their flooding limits.

* * * * *